United States Patent
Rein

(10) Patent No.: US 9,444,942 B2
(45) Date of Patent: Sep. 13, 2016

(54) MANAGING TELEPHONIC COMMUNICATIONS

(71) Applicant: Vivint, Inc., Provo, UT (US)

(72) Inventor: Harry Rein, Hingham, MA (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/522,506

(22) Filed: Oct. 23, 2014

(65) Prior Publication Data

US 2016/0119481 A1   Apr. 28, 2016

(51) Int. Cl.
*H04M 3/42* (2006.01)
*H04M 3/54* (2006.01)
*H04N 7/14* (2006.01)

(52) U.S. Cl.
CPC ........... *H04M 3/54* (2013.01); *H04M 3/42348* (2013.01); *H04N 7/147* (2013.01)

(58) Field of Classification Search
CPC ... H04M 3/54; H04M 3/42348; H04N 7/147
USPC .................................................. 379/211.02
See application file for complete search history.

(56) References Cited

U.S. PATENT DOCUMENTS

| | | | |
|---|---|---|---|
| 8,600,391 B2 | 12/2013 | Vendrow et al. | |
| 2006/0116115 A1 | 6/2006 | Lee | |
| 2011/0059732 A1 | 3/2011 | Cai et al. | |
| 2012/0088476 A1 | 4/2012 | Greenfield | |
| 2013/0023254 A1* | 1/2013 | Ricci | H04M 3/4234 455/417 |
| 2014/0196106 A1 | 7/2014 | Zellner | |
| 2014/0297787 A1* | 10/2014 | Baugh | H04L 67/34 709/217 |
| 2014/0335840 A1* | 11/2014 | Carr | H04M 3/543 455/417 |
| 2015/0256684 A1* | 9/2015 | Mohammed | H04L 63/0428 455/406 |

* cited by examiner

*Primary Examiner* — Creighton Smith
(74) *Attorney, Agent, or Firm* — Holland & Hart, LLP

(57) ABSTRACT

According to at least one embodiment, a computer-implemented method to manage incoming communications is described. An incoming call may be received on a landline. One or more devices may be located within a predetermined area based at least in part on the receipt of the incoming call. The incoming call may be forwarded to the one or more devices based at least in part on the locating.

18 Claims, 6 Drawing Sheets

MANAGING TELEPHONIC COMMUNICATIONS

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Home automation and security products can fully automate aspects of a residence and/or business. For example, automation systems can smartly manage incoming phone calls and dispense phone calls automatically to devices within a business or home location.

SUMMARY

According to at least one embodiment, a computer-implemented method to manage incoming communications is disclosed. An incoming call may be received on a landline. One or more devices may be located within a predetermined area based at least in part on the receipt of the incoming call. The incoming call may be forwarded to the one or more devices based at least in part on the locating.

In some embodiments, the incoming call may be forwarded to the one or more devices physically located within the predetermined area of an automation system. In some embodiments, input may be received from the one or more devices to direct the call to a particular device within an automation system. In some instances, the call may be a video call and the call may be forwarded to a device with video call capabilities.

In some embodiments, the incoming call may be forwarded to a message service based at least in on the determining when no devices are within the predetermined area. An administrator of an automation system may be notified that the incoming call was forwarded to the messaging service. The message received by the messaging service may be forwarded to a device external to the predetermined area. The message may be converted to text. The text may be sent to one or more devices associated with an automation system. The message may comprise at least one of an email, text message, social media message, and ping message. In some embodiments, the incoming call is received at a control panel for an automation system.

In some instances, locating the one or more devices may further comprise establishing a geo-fence around the predetermined area. A GPS position of the one or more devices may be determined. The GPS position of the one or more devices may be compared to the established geo-fence. In further instances, locating the one or more devices may further comprise establishing a wireless network associated with the predetermined area and determining if one or more devices are connected to the wireless network.

In some embodiments, unanswered incoming calls are forwarded to one or more devices associated with an automation system, wherein the one or more devices are external to the predetermined area.

According to another embodiment, an apparatus to manage incoming communications is also described. The apparatus may include a processor, a memory in electronic communication with the processor and instructions stored on the memory of the processor. The processor may execute the instructions to receive an incoming call on a landline and to locate one or more devices in a predetermined area based at least in part on the receipt of the incoming call. The processor may execute instructions to forward the incoming call to the one or more devices based at least in part on the locating.

According to another embodiment, a non-transitory computer-readable medium that may store instructions executable by a processor is also described. The instructions may receive an incoming call on a landline and locate one or more devices in a predetermined area based at least in part on the receipt of the incoming call. The instructions may forward the incoming call to the one or more devices based at least in part on the locating.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
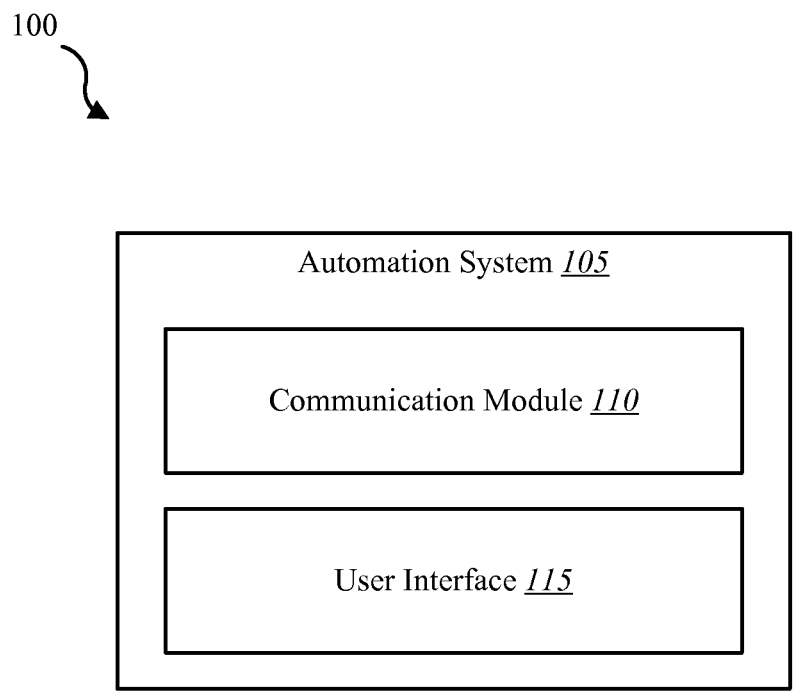
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to managing incoming communications. More specifically, the systems and methods described herein relate to managing the dissemination of incoming calls to a landline. Many businesses and residences comprise multiple phone lines. The phone lines may be landlines to a dedicated telephone and/or one or more cellular devices. Callers may be required to dial multiple numbers to reach the desired personnel. They also may need to dial a first number for a video call and a second number for a landline call. In some embodiments, an automation system panel is integrated with a landline telephone system and disseminates incoming calls to various devices within the automation system based on a location of the one or more devices connected to the automation system.

In some embodiments, the control panel may act as the home telephone. For example, the control panel may have a landline and telephone connected to it, either mounted on the wall or proximate the control panel. In other embodiments, the control panel itself may have telephonic capabilities. For example, the control panel may have a speaker and a microphone with which to conduct phone calls. In further embodiments, the control panel may have a dedicated telephone receiver to ensure more privacy while a person is conversing.

FIG. 1 is a block diagram illustrating one embodiment of an environment 100 in which the present systems and methods may be implemented. In some embodiments, the systems and methods described herein may be performed at least in part on or using an automation system 105. The environment 100 may include the automation system 105, a communication module 110, and a user interface 115.

The communication module 110 may receive a phone call on a landline and determine a location of one or more devices within the predetermined area associated with the automation system. For example, the communication module 110 may compare a location of the one or more devices with the boundaries of the predetermined area. If a device is within the confines of the predetermined area, the communication module 110 may forward an incoming call on a landline to the device. The predetermined area may comprise an automation system and subsequent buildings and/or homes, environments.

The user interface 115 may allow a user and/or administrator to interact with the automation system 105 and/or the communication module 110. A user may comprise any person with access to the automation and security system. A user may comprise an administrator, a family member, an employee and the like. The user may have varying levels of access and control over the automation and security system. The user interface 115 may facilitate communication between the user and the automation system 105.

Figure 2:
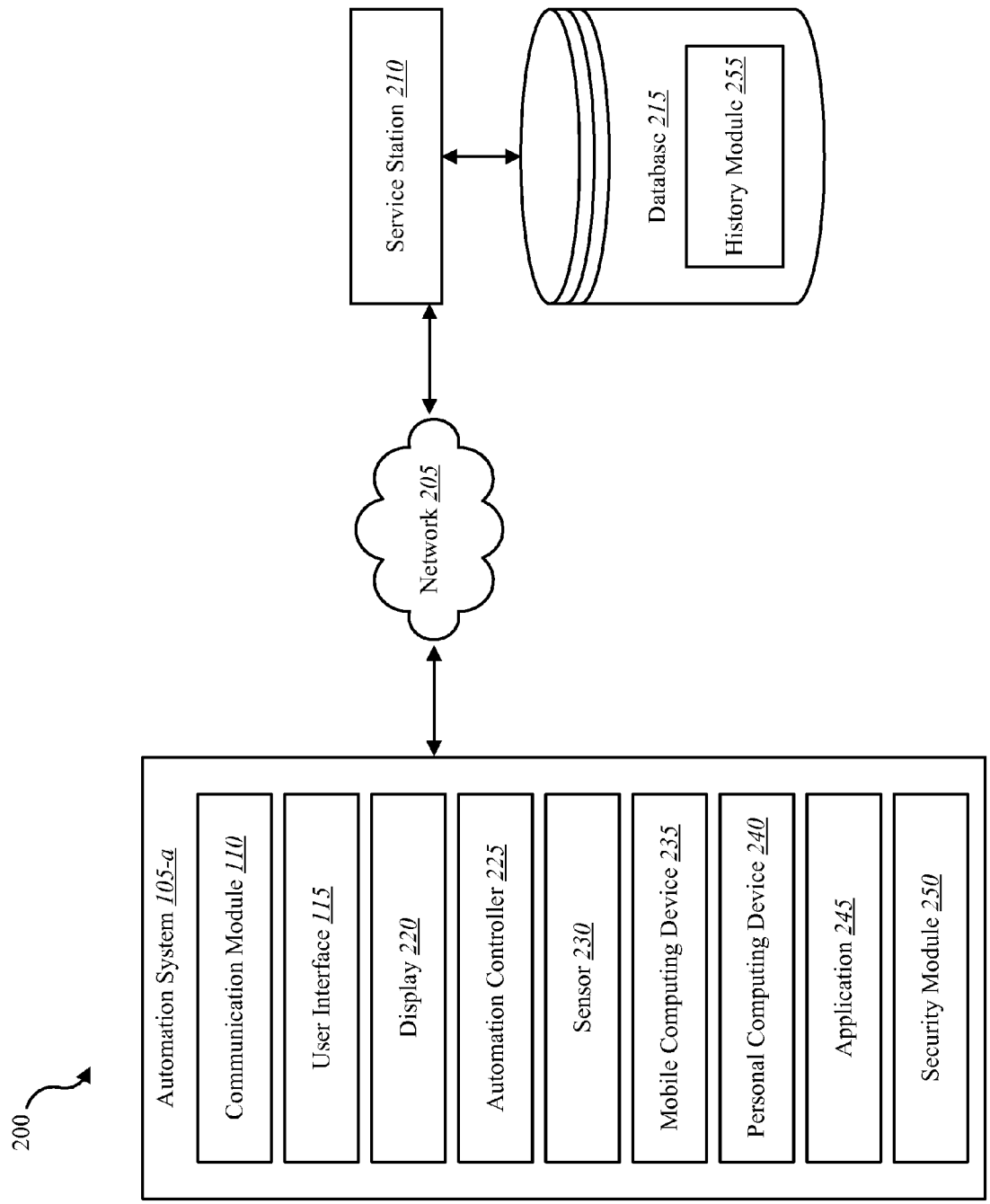
FIG. 2 is a block diagram of another environment in which the present systems and methods may be implemented.

Referring now to FIG. 2, in some embodiments, an environment 200 may include the components of the environment 100 described above, and may further include a network 205, a service station 210, and a database 215. Additionally, the environment 200 may include an automation system 105-a, which may be one example of the automation system 105 described above with reference to FIG. 1. The automation system 105-a may additionally include a display 220, an automation controller 225, a sensor 230, a mobile computing device 235, a personal computing device 240, an application 245, and a security module 250. The automation system 105-a may include various components and functionality that work cooperatively with the communication module 110 and the user interface 115, and/or may operate independently of the communication module 110 and the user interface 115.

The sensor 230 shown in FIG. 2 may represent one or more separate sensors or a combination of two or more sensors in a single sensor device. For example, the sensor 230 may represent one or more camera sensors and one or more motion sensors connected to the environment 200. The motion sensor may comprise a smart motion sensor. For example, the motion sensor may comprise one or more lasers capable of detecting directional motion. Additionally, or alternatively, the sensor 230 may represent a combination sensor such as both a camera sensor and a motion sensor integrated in the same sensor device. Although the sensor 230 is depicted as connecting directly to the automation system 105-a, in some embodiments, the sensor 230 may connect to the automation system 105-a over network 205. Additionally, or alternatively, the sensor 230 may be integrated with a home appliance or fixture such as a light bulb fixture. The sensor 230 may include an accelerometer to enable the sensor 230 to detect a movement. The sensor 230 may include a wireless communication device enabling the sensor 230 to send and receive data and/or information to and from one or more devices in the environment 200. Additionally, or alternatively, the sensor 230 may include a GPS sensor to enable tracking a location of the sensor 230. The sensor 230 may include a proximity sensor to enable the sensor 230 to detect a proximity of a person relative to a predetermined distance from a dwelling (e.g., geo-fencing). The sensor 230 may include one or more security detection sensors such as, for example, a glass break sensor, a motion detection sensor, or both. Additionally, or alternatively, the sensor 230 may include a smoke detection sensor, a carbon monoxide sensor, or both. The sensor 230 may include one or more olfactory sensors. In some instances, the sensor 230 may include one or more load sensors which may detect a load or weight applied to the sensor.

In some embodiments, the mobile computing device 235 may include one or more processors, one or more memory devices, and/or a storage device. Examples of the mobile computing device 235 may include mobile phones, smart phones, tablets, personal digital assistants (PDAs), wearable computers, ultra-mobile PCs, etc. Although the mobile computing device 235 is depicted as connecting directly to the automation system 105-a, in some embodiments, the mobile computing device 235 may connect to the automation system 105-a over the network 205. Additionally, the mobile computing device 235 may represent a single mobile computing device or multiple mobile computing devices that may access the automation system 105-a.

In some embodiments, the personal computing device 240 may include one or more processors, one or more memory devices, and/or a storage device. Examples of the personal computing device 240 may include a viewing device associated with a media content set top box, satellite set top box, cable set top box, DVRs, personal video recorders (PVRs), mobile computing devices, computers, servers, etc. Although the personal computing device 240 is depicted as connecting directly to the automation system 105-*a*, in some embodiments, the personal computing device 240 may connect to the automation system 105-*a* over the network 205. Additionally, the personal computing device 240 may represent a single mobile computing device or multiple mobile computing devices that may access the automation system 105-*a*.

In some embodiments, a user may access the functions of automation system 105-*a* from either the mobile computing device 235 or the personal computing device 240. For example, in some embodiments, the user may have a user profile associated with the automation system 105-*a* and may access the system via the mobile computing device 235 or the personal computing device 240. In further embodiments, the user may have been granted limited accessibility to the automation system 105-*a* without generating a user profile. The user may access the automation system 105-*a* using their personal computing device 240 and/or mobile computing device 235 without a user profile associated with the automation system 105-*a*. In some embodiments, the mobile computing device 235 and/or the personal computing device 240 may include a mobile application interfacing with one or more functions of the automation system 105-*a*, and the service station 210.

Examples of the automation controller 225 may include a dedicated automation computing device. Examples of a dedicated computing device may include a wall-mounted controller, a remote control, a voice activated controller, and the like. In some embodiments, the automation controller 225 may control aspects of a property as well as receive and display notifications regarding monitored activity of a property. In still further embodiments, the automation controller 225 may comprise telephonic capabilities and be connected to a landline.

In some embodiments, the application 245 may allow a user to control (either directly or via automation controller 225) an aspect of the monitored property based on the user accessibility permissions, including security, energy management, locking or unlocking a door, checking the status of a door, locating a person or item, controlling lighting, thermostat, cameras, receiving notification regarding a current status or anomaly associated with a home, office, place of business, and the like. In some configurations, the application 245 may enable the automation system 105-*a* to interface with the automation controller 225 and enable the user interface 115 to display automation, security, and/or user management content on the display 220, the mobile computing device 235 and/or the personal computing device 240. Further, the application 245 may be installed on the mobile computing device 235 and/or on the personal computing device 240 to allow a user to interface with the automation system 105-*a* and the service station 210.

In some embodiments, the automation system 105-*a* may communicate with the service station 210 via the network 205. Examples of the network 205 include cloud networks, local area networks (LAN), wide area networks (WAN), virtual private networks (VPN), wireless networks (using 802.11, for example), and/or cellular networks (using 3G and/or LTE, for example), etc. The network 205 may be a single network, or may include multiple interconnected, overlapping, or coincidental networks. For example, in some embodiments, the network 205 may include multiple networks interconnected to facilitate communication or may include redundant networks. For example, the network 205 may represent a first network (e.g., the Internet) and a second network (e.g., cellular networks).

The service station 210 shown in FIG. 2 may represent one or more separate service stations or a combination service stations. The service station 210 may be a network operations center, a monitoring center, a service station or any similar station in association with the automation system service provider. In some embodiments, the service station 210 may perform various and/or all aspects of the communication module 110.

In some embodiments, the service station 210 may be coupled to the database 215. The database 215 may include, for example, different illumination tracking for each automation system 105-*a* monitored by the service station 210. For example, the database 215 may include a history module 255 which may store and periodically track the dissemination of incoming phone calls. For example, the communication module 110 may track the origination number of incoming phone calls and determine which device the origination number is most frequently answered. In some instances, all calls may from an origination number may be directed to a specific device associated with a particular user. The data collected in the history module 255 may help predict which device to direct specific incoming calls. The database 215 may include other information including, for example, historical information about the automation system 105-*a* and other aspects of environment 200, and the like.

Figure 3:
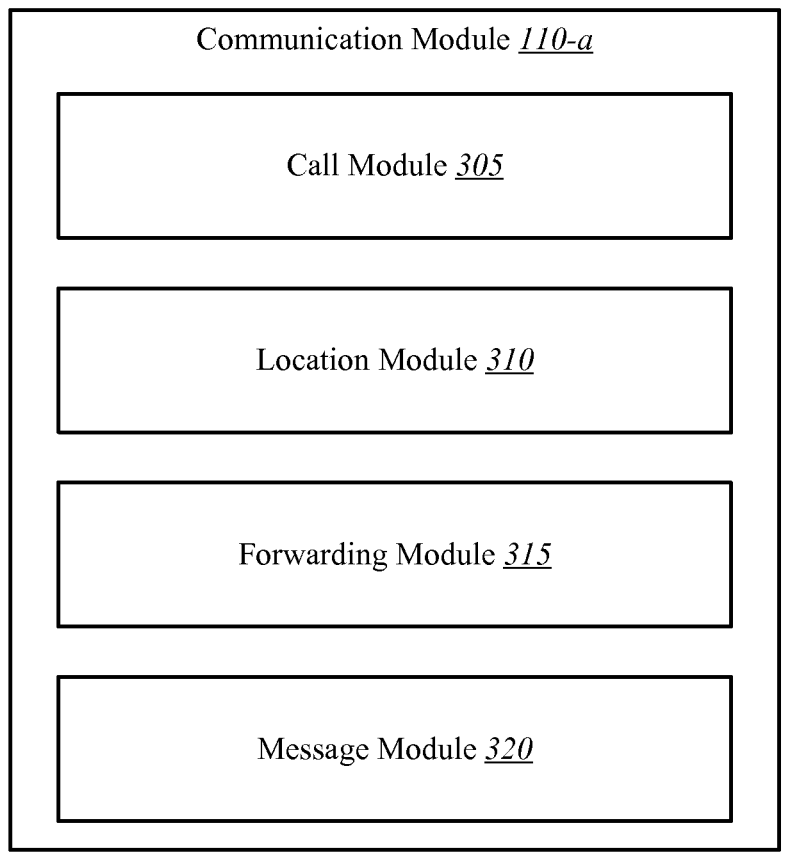
FIG. 3 is a block diagram of an example communications module of the environments shown in FIGS. 1 and 2.

FIG. 3 is a block diagram 300 illustrating one example of a communication module 110-*a*. The communication module 110-*a* may be one example of the communication module 110 depicted in FIGS. 1 and/or 2. As depicted, the communication module 110-*a* may include a call module 305, a location module 310, a forwarding module 315, and a message module 320. The communication module 110-*a* may include additional modules and capabilities in other embodiments. Similarly, the communication module 110-*a* may include fewer number of modules and functionality than that which is described with reference to FIG. 3. The communication module 110-*a* may manage incoming communications.

In some embodiments, the call module 305 may receive incoming calls. For example, the call module 305 may be linked to a landline. The landline may comprise metal wire telephone, broadband connection, fiber optic connection, voice over internet protocol (VoIP), computer-based telephony, and the like. The call module 305 may receive an incoming call. The call module 305 may recognize the type of call being made and may identify a source of the call. For example, the call module 305 may recognize the call as a video call, a voice call, an international call, a mobile call, and the like. The call module 305 may also determine an origination location. For example, if the call originated from a particular city or country. The call module 305 may additionally determine a origination number such as caller identification number or calling telephone number, voice over internet protocol address, and the like.

The location module 310 may locate one or more devices within a predetermined area based at least in part on the receipt of the incoming call. The one or more devices may be connected to and/or associated with an automation system. The location module 310 may send a message to each device associated with a device list. The device list may comprise a list of approved devices for incoming calls. It may be created by a user or administrator of the automation system. The device list may further comprise all devices connected to the automation system. The message may be a sort of ping message requesting one or more pieces of information from the devices. For example, the one or more pieces of information may comprise a power status (e.g. if the device is turned on, charged, battery percentage, etc.), a device identification number (e.g. mobile identification number, a unique device identifier, hardware identification number, etc.), a location (e.g. GPS coordinates, Wifi connectivity, triangulation coordinates, etc.), and the like.

The location module 310 may additionally define a predetermined area within which to locate devices. For example the predetermined area may be a business location, a warehouse, a home, a school, or the like. The predetermined area may comprise a building, an outdoor area, or some combination thereof. The location module 310 may define the predetermined area using a series of technologies. For example, the location module 310 may use a local area wireless technology (Wifi) to define an area. Wifi has a limited range that may be used to encompass an area. Additionally, Wifi may be used in conjunction with other technologies to increase or decrease the range. For example, multiple Wifi may be used to create a series of overlapping ranges and define an area. Boosting technologies may also increase the range of Wifi. The location module 310 may additionally use Bluetooth technology or another wireless networking device similar to Wifi.

In further embodiments, the location module 310 may use a global positioning system. For example, the location module 310 may use a geo-fence as virtual perimeter for a real-world geographic area. The geo-fence may be dynamically generated. For example, the geo-fence may comprise a radial boundary around a point location (e.g. home, business, etc.). In further embodiments, the geo-fence may comprise a predefined set of boundaries such as defining the boundaries of a property line or the like.

The location module 310 may compare the information received from the device and the predetermined area to determine which devices are within the confines of the home. In some embodiments, the device list may comprise static devices such as computers, game systems, a control panel, a TV, and the like. The static devices may comprise a series of devices that do not move outside of the predetermined area. In other embodiments, the location module 310 may compare the location information to the predetermined area to determine which devices are within the confines of the predetermined area. This may comprise determining which devices are connected to a wireless network or which GPS coordinates lie within a geo-fence. The location module 310 may produce a list of devices within and/or outside of the predetermined area.

The forwarding module 315 may use information from the location module 310 and the call module 305 to determine which devices will receive the incoming call. For example, the forwarding module 315 may determine which type of call is incoming and where the call originated from and may determine which device is within the predetermined area. Based on the combination of devices and incoming call information, the forwarding module 315 may forward the incoming call to a particular device. In some embodiments, certain types of calls may be forwarded to appropriate devices. For example, video calls may be forwarded to devices with video capabilities. In other embodiments, the origination information of an incoming call may determine the appropriate device to receive the call. For example, a particular user may request all incoming calls from a particular origination location to be forwarded to their device. In other embodiments, the forwarding module 315 may simply forward the incoming call to all devices located within the predetermined area.

In some embodiments, incoming calls may be forwarded to a device outside of the predetermined area. For example, if a call is unanswered, the forwarding module 315 may forward the call to another device outside of the predetermined area. In further embodiments, a user may want calls from a specific caller to always be forwarded to their device regardless of location. In some instances, the user may provide input as to which device should receive the incoming call. For example, a user with a device within the predetermined area may receive a notification of an incoming call. The notification may comprise call details such as one or more of a number, origination, name, and the like. The user may respond to the notification directing the incoming call to a particular device based at least in part on one or more call details. For example, the user may answer a private video call on a laptop computer in their office. The user may additionally direct a video conference to a device in a conference room or other group setting environment. The user may additionally have the option to screen the incoming call and send the call directly to the messaging service. In still further embodiments, the user may have the ability to block all calls from a particular origination. For example, if a user is being harassed or other present with unbecoming behavior, the user may have the option to not receive or be notified of any incoming calls with a particular origination. The user may additionally request the unbecoming origination not to have the ability to use a messaging service.

In further embodiments, unanswered calls may be forwarded to the message module 320. The message module 320 may be a message service which may receive messages from unanswered incoming calls. The messages may be video messages, voice messages, or text messages. In some embodiments, voice or audio in video messages may be converted to text messages. In some instances, the message module 320 may notify an administrator or user of an automation system that an incoming call was unanswered at the predetermined area. The message module 320 may further inform the user that a message was left and may forward the message. In some embodiments, the message module 320 may electronically send the voice, video or text message. In some embodiments, the user may access the messages using an application on their mobile device. The message module 320 may additionally transmit the converted message (from voice/audio to text) to the user to allow the user to read the message.

Figure 4:
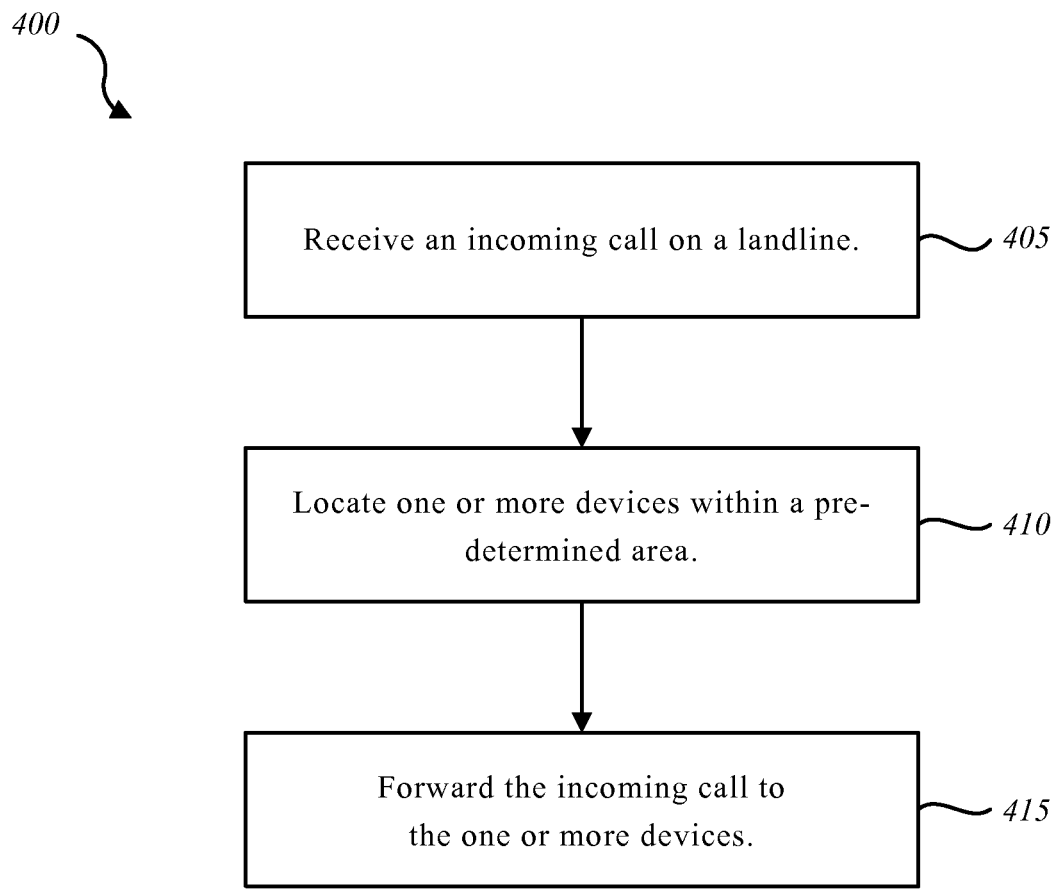
FIG. 4 is a flow diagram illustrating an exemplary method for managing incoming communications.

FIG. 4 is a flow diagram illustrating one embodiment of a method 400 for managing incoming communications. In some configurations, the method 400 may be implemented in whole or in part by the communication module 110 of the automation system 105 shown in FIGS. 1 and/or 2. In further embodiments, the method 400 may be performed generally by the automation system 105 shown in FIGS. 1 and/or 2, or even more generally by the environments 100, 200 shown in FIGS. 1 and/or 2.

At block 405, an incoming call may be received on a landline. The call may be received by a control panel for an automation system. The control panel may act as a telephone and allow a user to answer the incoming call. The call may also be forwarded to one or more devices associated with an automation system. Information surrounding the incoming call may be perceived. For example, the type of call, call origination, call back number, and the like may be determined. The type of call may comprise a voice call, video call, conference call, or the like. The call origination may comprise one of city, state, or country where the call originated from. In some embodiments, it may additionally include the name of the origination such as a personal name, a business name, or the like.

At block 410, one or more devices within a predetermined area may be located based at least in part on the receipt of the incoming call. For example, a location of one or more devices may be requested. The location information may comprise GPS coordinates, connectivity to a Wifi connection, cellular triangulation, and the like. In some instances, the devices may not comprise mobile devices. For example, the one or more devices may comprise a computer, a landline telephone, a smart television, a game console, or the like. These types of devices may not move around or outside of the predetermined area.

In other embodiments, the location of the devices may be compared to the predetermined area to determine if the device is located within the confines of the predetermined area. For example, the predetermined area may be defined using wireless technologies, geo-fencing technologies, or the like. The device may be connected to a Wifi channel associated with the automation system. Because the Wifi has a limited geographical reach, it may define the predetermined area and a device connected to the Wifi is thus within that predetermined area. The GPS coordinates or triangulation may be compared to a geo-fence to determine if one or more devices are within the confines of the predetermined area.

At block 415, the incoming call may be forwarded to the one or more devices based at least in part on the locating. For example, if a first device is within the predetermined area, the incoming call may be forwarded to the first device. If the incoming call is a video call and a second device with video call capabilities is within the predetermined area, the incoming call may be forwarded to the second device. In some embodiments, the origination of the incoming call may also determine where the call is directed to. For example, a specific client may always request to speak with a specific employee. The incoming call to the business location may be automatically forward to the employee's device or message system if the employee's device is not within the confines of the predetermined area.

Figure 5:
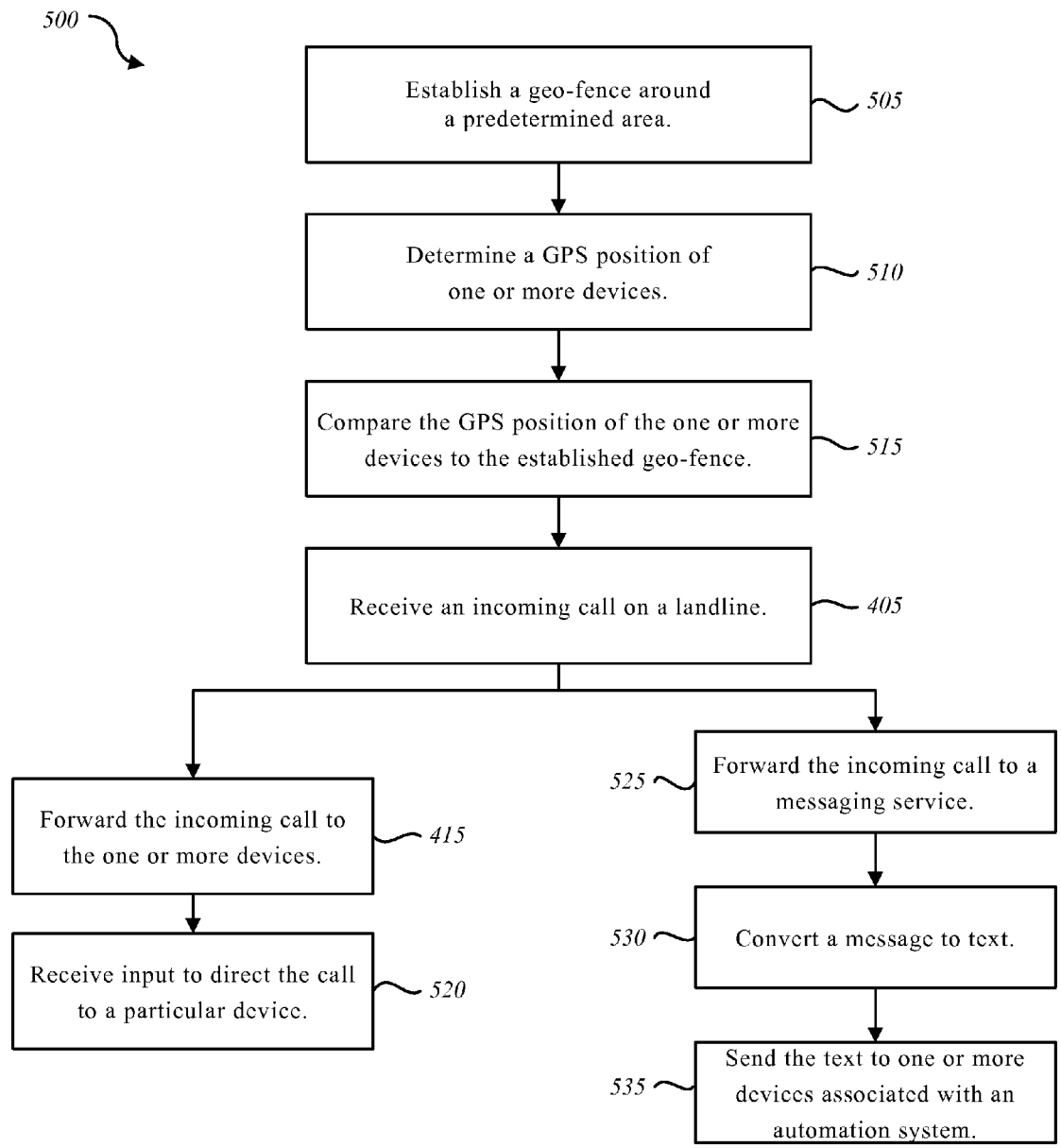
FIG. 5 is a flow diagram illustrating another exemplary method for managing incoming communications.

FIG. 5 is a flow diagram illustrating one embodiment of a method 500 for managing incoming communications. In some configurations, the method 500 may be implemented in whole or in part by the communication module 110 of the automation system 105 shown in FIGS. 1 and/or 2. In further embodiments, the method 500 may be performed generally by the automation system 105 shown in FIGS. 1 and/or 2, or even more generally by the environments 100, 200 shown in FIGS. 1 and/or 2.

At block 505, a geo-fence around a predetermined area may be established. For example, the predetermined area may comprise a commercial location, a residential location, or the like. The predetermined area may comprise a structure such as a building or dwelling. The predetermined area may be associated with an automation system. The predetermined area may comprise a structure, surrounding grounds, a structure and surround grounds, or some combination thereof. The geo-fence may comprise a series of GPS coordinates to adequately define a boundary of the predetermined area. The GPS coordinates may comprise four corners of a property or may require more or fewer coordinates to adequately define a boundary.

At block 510, a GPS position of one or more devices may be determined. For example, information regarding GPS coordinates may be requested form each device associated with an automation system. In some embodiments, GPS coordinates may only be requested from mobile devices within an automation system. For example, a landline phone, game console, desktop computer, and the like may be substantially stationary devices. In contrast, mobile computers, tablets, mobile phones, and the like may be very mobile and may or may not be located with the predetermined area. In some embodiments, an automation system may request GPS coordinates from the devices.

At block 515, the GPS position of the one or more devices may be compared to the established geo-fence. For example, the automation system may receive a longitude and latitude for each device. The automation system may compare the coordinates of the device to the geo-fence. The automation system may whether determine the GPS coordinates of the one or more devices are within the confines of the predetermined area. In some embodiments where the devices are substantially non-mobile, the automation system may automatically determine the devices to be within the confines of the geo-fence.

At block 405, an incoming call may be received on a landline associated with the predetermined area. If, at block 515, one or more devices are determined to be within the geo-fence defining the predetermined area, then at block 415, the incoming call may be forwarded to the one or more devices within the predetermined area. In some embodiments, at block 520, input may be received to direct the incoming call to a particular device. For example, a user may be notified of an incoming voice call from a relative and may want to take the call on a game console in a living room. In another embodiment, a user may want to answer the phone call in a conference room with other personnel.

If, at block 515, no devices are determined to be within the confines of the predetermined area, at block 525, the incoming call may be forwarded to a message service. The messaging service may be a messaging service provided by the automation system or an external message service. In some embodiments, the caller may select an intended recipient. For example, the caller may be attempting to reach a business or household generally, or may wish to speak to a specific person or group of people. The messaging service may provide the caller with an option to select the intended recipients or group of recipients. If the caller leaves a message, then at block 530, the message may be converted to text. For example, some users may prefer to receive transcribed messages for each of dissemination. The users may also prefer to receive messages upon receipt. Therefore, if a user is away from the predetermined location, the user may still receive messages and may opt to receive voice messages, text messages, or both.

At block 535, the text may be sent to one or more devices associated with the automation system. For example, the text may be sent via a ping message, email, SMS, social media message, or the like. The text may be sent to the selected recipients of the caller or may be generally sent to an administrator, assistant, all users, or some combination thereof.

Figure 6:
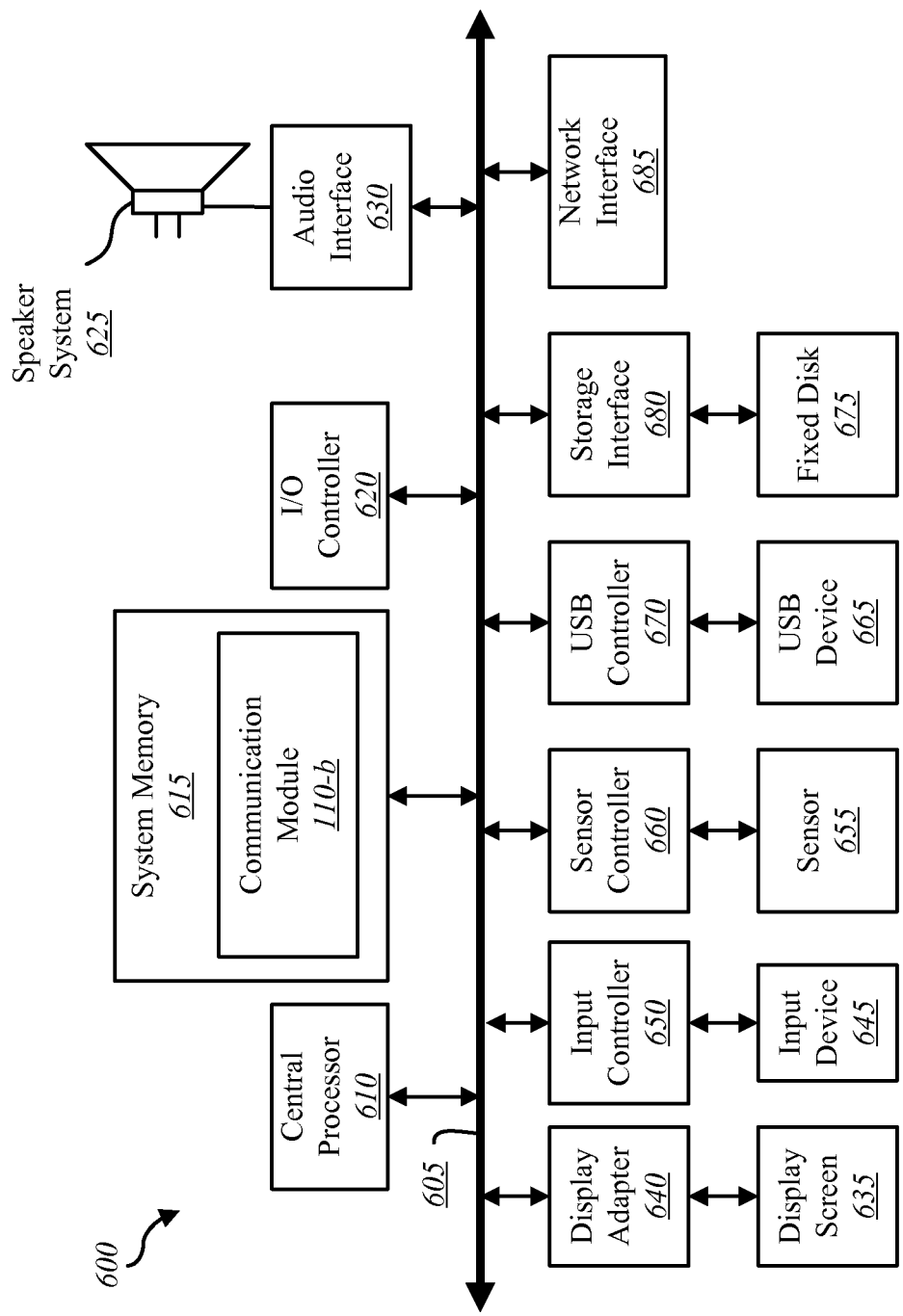
FIG. 6 is a block diagram of a computer system suitable for implementing the present systems and methods of FIGS. 1-4.

FIG. 6 depicts a block diagram of a controller 600 suitable for implementing the present systems and methods. In one configuration, the controller 600 may include a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can include, among other code, the Basic Input-Output system (BIOS) which controls basic hardware operation such as the interaction with peripheral components or devices. For example, a communication module 110-*b* to implement the present systems and methods may be stored within the system memory 615. The communication module 110-*b* may be an example of the communication module 110 illustrated in FIGS. 1, 2, and/or 3. Applications (e.g., application 245) resident with controller 600 are generally stored on and accessed via a non-transitory computer readable medium, such as a hard disk drive (e.g., fixed disk drive 675) or other storage medium. Additionally, applications can be in the form of electronic signals modulated in accordance with the application and data communication technology when accessed via the network interface 685.

Storage interface 680, as with the other storage interfaces of controller 600, can connect to a standard computer readable medium for storage and/or retrieval of information, such as a fixed disk drive 675. The fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2® UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method to manage incoming communications, comprising:
    receiving an incoming call on a landline integrated with a control panel of an automation system, wherein the control panel comprises a user interface;
    locating one or more devices within a predetermined area based at least in part upon receipt of the incoming call;
    forwarding the incoming call to the one or more devices based at least in part on the locating; and
    forwarding unanswered incoming calls to one or more devices associated with the automation system, wherein the one or more devices are outside of the predetermined area.

2. The computer-implemented method of claim 1, wherein the incoming call is forwarded to the one or more devices physically located within the predetermined area of the automation system.

3. The computer-implemented method of claim 1, further comprising:
    receiving input from the one or more devices to direct the call to a particular device within the automation system.

4. The computer-implemented method of claim 3, wherein the call is a video call and the call is forwarded to a device with video call capabilities.

5. The computer-implemented method of claim 1, further comprising:
    forwarding the incoming call to a messaging service based at least in part on determining when no devices are within the predetermined area.

6. The computer-implemented method of claim 5, further comprising:
    notifying an administrator of the automation system that the incoming call was forwarded to the messaging service.

7. The computer-implemented method of claim 5, further comprising:
    forwarding a message received by the messaging service to a device external to the predetermined area.

8. The computer-implemented method of claim 7, further comprising:
    converting the message to text; and
    sending the text to one or more devices associated with the automation system.

9. The computer-implemented method of claim 8, wherein the message comprises at least one of an email, text message, social media message, and ping message.

10. The computer-implemented method of claim 1, wherein locating the one or more devices further comprises:
    establishing a geo-fence around the predetermined area;
    determining a GPS position of the one or more devices; and
    comparing the GPS position of the one or more devices to the established geo-fence.

11. The computer-implemented method of claim 1, wherein locating the one or more devices further comprises:
    establishing a wireless network associated with the predetermined area;
    determining if the one or more devices are connected to the wireless network.

12. An apparatus to manage incoming communications, comprising:
    a processor;
    a memory in electronic communication with the processor; and
    instructions stored in the memory, the instructions being executable by the processor to:
        receive an incoming call on a landline integrated with a control panel of an automation system, wherein the control panel comprises a user interface;
        locate one or more devices within a predetermined area based at least in part upon the receipt of the incoming call;
        forward the incoming call to the one or more devices based at least in part on the locating; and
        forward unanswered incoming calls to one or more devices associated with the automation system, wherein the one or more devices are outside of the predetermined area.

13. The apparatus of claim 12, wherein the incoming call is forwarded to the one or more devices physically located within the predetermined area of the automation system.

14. The apparatus of claim 12, wherein the instructions are executable by the processor to:
    receive input from the one or more devices to direct the call to a particular device within the automation system.

15. A non-transitory computer-readable medium storing instructions executable by a processor to:
    receive an incoming call on a landline integrated with a control panel of an automation system, wherein the control panel comprises a user interface;
    locate one or more devices within a predetermined area based at least in part upon the receipt of the incoming call;
    forward the incoming call to the one or more devices based at least in part on the locating; and
    forward unanswered incoming calls to one or more devices associated with the automation system, wherein the one or more devices are outside of the predetermined area.

16. The computer-readable medium of claim 15, wherein the incoming call is forwarded to the one or more devices physically located within the predetermined area of the automation system.

17. The computer-readable medium of claim 15, wherein the instructions are executable by the processor to:
    receive input from the one or more devices to direct the call to a particular device within the automation system.

18. The computer-readable medium of claim 17, wherein the call is a video call and the call is forwarded to a device with video call capabilities.

* * * * *